United States Patent
Lim et al.

(10) Patent No.: US 10,535,145 B2
(45) Date of Patent: Jan. 14, 2020

(54) CONTEXT-BASED, PARTIAL EDGE INTELLIGENCE FACIAL AND VOCAL CHARACTERISTIC RECOGNITION

(71) Applicant: MOTOROLA SOLUTIONS, INC., Chicago, IL (US)

(72) Inventors: Chew How Lim, Kedah (MY); Bing Qin Lim, Penang (MY); Mohd Faisal Abdullah, Penang (MY); Guo Dong Gan, Kuala Lumpur (MY); Rm Muthaiah Ramanathan, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 133 days.

(21) Appl. No.: 15/650,676

(22) Filed: Jul. 14, 2017

(65) Prior Publication Data

US 2019/0019297 A1    Jan. 17, 2019

(51) Int. Cl.
*G06T 7/246* (2017.01)
*G06T 7/73* (2017.01)
(Continued)

(52) U.S. Cl.
CPC .......... *G06T 7/246* (2017.01); *G06K 9/00248* (2013.01); *G06K 9/00255* (2013.01);
(Continued)

(58) Field of Classification Search
None
See application file for complete search history.

(56) References Cited

U.S. PATENT DOCUMENTS

| 7,634,662 | B2 | 12/2009 | Monroe |
| 7,801,512 | B1* | 9/2010 | Myr .......................... G08G 1/20 340/466 |

(Continued)

FOREIGN PATENT DOCUMENTS

WO    20070114753    10/2007

OTHER PUBLICATIONS

PCT/US2018/037318 International Search Report and Written Opinion of the International Searching Authority dated Aug. 30, 2018 (14 pages).

(Continued)

*Primary Examiner* — Michelle M Entezari
(74) *Attorney, Agent, or Firm* — Michael Best & Friedrich LLP (57) ABSTRACT

A recognition device and method for recognizing a target. The recognition device includes a sensor and an electronic processor. The electronic processor configured to receive the characteristic from the sensor. The electronic processor identifies a profile based on the characteristic and compares the profile to a plurality of predetermined profiles to determine an identity profile. The electronic processor identifies the target based on the identity profile and determines, based on at least one selected from the group consisting of a location of the target, speed of the target, and a direction of movement of the target, a virtual geographic boundary. The electronic processor causes a transmission of the at least one selected from the group consisting of the identity profile and the characteristic to at least one associated device located in the virtual geographic boundary.

16 Claims, 4 Drawing Sheets

(51) Int. Cl.
*G06K 9/00* (2006.01)
*G10L 15/20* (2006.01)

(52) U.S. Cl.
CPC ..... *G06K 9/00765* (2013.01); *G06K 9/00912* (2013.01); *G06T 7/73* (2017.01); *G06T 2207/30196* (2013.01); *G10L 15/20* (2013.01)

(56) References Cited

U.S. PATENT DOCUMENTS

| | | | | |
|---|---|---|---|---|
| 9,098,954 | B1* | 8/2015 | Byrd | G07C 9/00111 |
| 9,363,357 | B2* | 6/2016 | Hansen | H04M 1/72547 |
| 9,513,364 | B2 | 12/2016 | Hall et al. | |
| 9,524,449 | B2 | 12/2016 | Yang et al. | |
| 9,788,160 | B1* | 10/2017 | Gu | H04W 4/021 |
| 9,852,636 | B2* | 12/2017 | Chow | G08G 1/04 |
| 2003/0067542 | A1* | 4/2003 | Monroe | H04N 7/181 |
| | | | | 348/148 |
| 2011/0080303 | A1* | 4/2011 | Goldberg | G08G 1/07 |
| | | | | 340/909 |
| 2011/0148634 | A1* | 6/2011 | Putz | G08B 21/22 |
| | | | | 340/541 |
| 2012/0105243 | A1* | 5/2012 | Datodi | G08B 27/008 |
| | | | | 340/686.6 |
| 2013/0024202 | A1* | 1/2013 | Harris | G06Q 30/00 |
| | | | | 705/1.1 |
| 2013/0178233 | A1* | 7/2013 | McCoy | H04W 4/021 |
| | | | | 455/456.3 |
| 2014/0063249 | A1 | 3/2014 | Miller et al. | |
| 2014/0152472 | A1* | 6/2014 | Tseng | G08G 1/146 |
| | | | | 340/932.2 |
| 2015/0024705 | A1* | 1/2015 | Rashidi | H04W 4/90 |
| | | | | 455/404.2 |
| 2015/0092979 | A1 | 4/2015 | Meredith et al. | |
| 2016/0014564 | A1* | 1/2016 | Del Vecchio | G08G 1/20 |
| | | | | 455/456.2 |
| 2016/0364395 | A1* | 12/2016 | Shorten | G06F 16/125 |
| 2017/0124848 | A1* | 5/2017 | Zhou | G08B 21/22 |
| 2017/0169308 | A1 | 6/2017 | Capota et al. | |
| 2017/0193820 | A1* | 7/2017 | Sham | G05D 1/104 |
| 2017/0193828 | A1 | 7/2017 | Holtzman et al. | |
| 2017/0225336 | A1* | 8/2017 | Deyle | B25J 13/086 |
| 2017/0337753 | A1* | 11/2017 | Joodaki | G07C 5/0841 |
| 2017/0337790 | A1* | 11/2017 | Gordon-Carroll | |
| | | | | G08B 13/19645 |
| 2018/0027772 | A1* | 2/2018 | Gordon | A01K 15/023 |
| 2018/0356841 | A1* | 12/2018 | Zilberstein | B64D 1/16 |

OTHER PUBLICATIONS

ONSSI, "Ocularis Video Management Software," brochure (2017) 46 pages.

* cited by examiner

CONTEXT-BASED, PARTIAL EDGE INTELLIGENCE FACIAL AND VOCAL CHARACTERISTIC RECOGNITION

BACKGROUND OF THE INVENTION

Public safety personnel patrolling or responding to an incident in an area may need to locate a suspect, a missing person, a stolen vehicle, or other persons or objects of interest (targets). In some cases (for example, in a large or crowded area), manual visual scanning may not be sufficient to locate a target. Accordingly public safety personnel may use recognition devices (for example, a body worn camera, a drone or a vehicle-mounted device such as an in-vehicle dash camera), which capture images and/or audio of the area to assist them in locating targets. For example, captured video images may be analyzed using multiple-object classifiers, multiple single object classifiers, or single object classifiers combined with post filtering to identify targets in video images.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Quick and accurate identification of an object of interest can improve outcomes for public safety patrol and response efforts. However, some recognition methods implemented completely on the recognition device or a remote server may be slow and/or consume an undesirable amount of power and device memory. Some recognition devices implement real-time identification using analytic engines (for example, video), which utilize classifiers, neural networks, and the like to detect and identify objects.

Characteristic recognition may be done on the server. The recognition device constantly transmits detected facial features to the server for identification. However, such a method may consume a large portion of the recognition device's power and bandwidth, which affects, among other things, data round-trip latency.

Alternatively, characteristic recognition may be performed "on the edge" or on the recognition device (a method of computing known as edge intelligence). However, the reference database used for recognition may be too large to store on the recognition device. The recognition process also typically causes the electronic processor to consume a significant amount of power, which may adversely affect battery life.

Accordingly, embodiments described herein provide, among other things, a partial edge intelligence characteristic recognition system and method.

One example embodiment provides a recognition device. The recognition device includes a sensor and an electronic processor. The sensor is configured to sense a characteristic of a target. The sensor is at least one selected from the group consisting of an audio sensor, a camera, and a video sensor. The electronic processor is configured to receive the characteristic from the sensor. The electronic processor identifies a profile based on the characteristic and compares the profile to a plurality of predetermined profiles to determine an identity profile. The electronic processor identifies the target based on the identity profile and determines, based on at least one selected from the group consisting of a location of the target, a speed of the target, and a direction of movement of the target, a virtual geographic boundary. The electronic processor causes a transmission of at least one selected from the group consisting of the identity profile and the characteristic to at least one device located in the virtual geographic boundary.

Another example embodiment provides a method of recognizing a target. The method includes receiving, from a sensor selected from the group consisting of an audio sensor, a camera, and a video sensor, a characteristic of the target and identifying a profile based on the characteristic. The method further includes comparing the profile to a plurality of predetermined profiles to determine an identity profile and identifying the target based on the identity profile. The method also includes determining, based on at least one selected from the group consisting of a location of the target, speed of the target, and a direction of movement of the target, a virtual geographic boundary and causing a transmission of the at least one selected from the group consisting of the identity profile and the characteristic to at least one device located in the virtual geographic boundary.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

Figure 1:
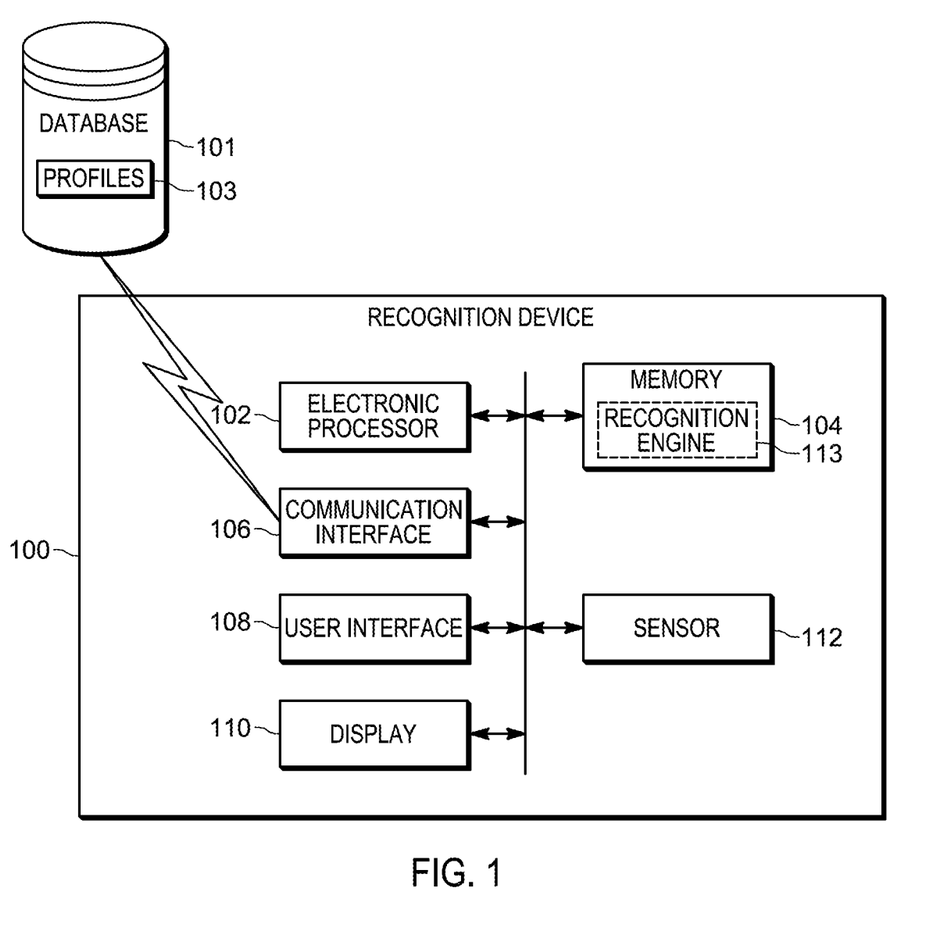
FIG. 1 is a diagram of a recognition device in accordance with some embodiments.

FIG. 1 is a diagram of a recognition device 100 in accordance with some embodiments. In the example illustrated, the recognition device 100 includes an electronic processor 102, a memory 104, a communication interface 106, a user interface 108, a display 110, and a sensor 112. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. The recognition device 100 is presented as an example that may be programmed and configured to carry out the functions described herein. In some embodiments, the recognition device 100 may be a handheld device or a wearable device. For example, the recognition device 100 may be a portable communication device, such as, for example a portable two-way radio including a camera, a body-worn camera, a smart telephone, a tablet computer, and the like. In some embodiments, components of the recognition device 100 may be separately implemented, and may be communicatively coupled by a bus or by a suitable communication network. For example, the recognition device 100 may include a dash camera in a vehicle coupled to a mobile two-way radio, a network-connected portable computer, or similar device in or coupled to the vehicle. It should be understood that, in other constructions, the recognition device 100 includes additional, fewer, or different components than those illustrated in FIG. 1.

As illustrated in FIG. 1, in some embodiments, the recognition device 100 is communicatively coupled to, and writes data to and from, one or more of a remote server or a database 101. The database 101 may be a database housed on a suitable database server communicatively coupled to and accessible by the recognition device 100. In alternative embodiments, the database 101 may be part of a cloud-based database system accessible by the recognition device 100 over one or more networks. In some embodiments, all or part of the database 101 may be locally stored on the recognition device 100. In some embodiments, as described below, the database 101 electronically stores one or more predetermined profiles 103. Each predetermined profile 103 includes characteristic information regarding a particular target and an identity of the profile. As explained in further detail below, the characteristic information is used by the device to identify the target. In some embodiments, the database 101 is part of a computer-aided dispatch system. It should be understood that in some embodiments the recognition device 100 may be configured to communicate and implement the methods described herein with more than one database.

The electronic processor 102 obtains and provides information (for example, from the memory 104 and/or the communication interface 106), and processes the information by executing one or more software instructions or modules, capable of being stored, for example, in a random access memory ("RAM") area of the memory 104 or a read only memory ("ROM") of the memory 104 or another non-transitory computer readable medium (not shown). The software can include firmware, one or more applications, program data, filters, rules, one or more program modules, and other executable instructions. The electronic processor 102 is configured to retrieve from the memory 104 and execute, among other things, software related to the control processes and methods described herein.

The memory 104 can include one or more non-transitory computer-readable media, and includes a program storage area and a data storage area. The program storage area and the data storage area can include combinations of different types of memory, as described herein. The memory 104 may take the form of any non-transitory computer-readable medium. In the embodiment illustrated, the memory 104 stores, among other things, a characteristic recognition engine 113. The characteristic recognition engine 113 analyzes audio, video, and/or other input to, among other things, identify and detect one or more characteristics of a target. The characteristic is then used to identify the particular target. For example, the characteristic analyzed in a visual media is an object, shape, color, motion, and the like within the visual media. In some embodiments, the characteristic recognition engine 113 includes other features (for example, neural networks) for characteristic detection and analysis.

A target is any distinguishable being or inanimate object. For example, when the target is a human being the characteristic of the target detected by the characteristic recognition engine 113 may be one or more of physical feature or an anatomical feature. For example, the characteristic may be one or more of a facial feature, a voice or vocal feature, a height, a hair color, a skin tone, a tattoo, a birthmark, an eye color, a body shape, a gait, a feature of a wearable article (for example, jewelry, a clothing color, clothing pattern, or a logo), or another physical feature, with which the person can reasonably be identified. The wearable article may be an article of clothing or a wearable accessory (for example, a piece of jewelry, a hat or headpiece, a bag, a purse, or a backpack) on the target.

The communication interface 106 may include a transceiver for wirelessly coupling to wireless networks (for example, land mobile radio (LMR) networks, Long Term Evolution (LTE) networks, Global System for Mobile Communications (or Groupe Spécial Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the communication interface 106 may include a connector or port for receiving a connection to a wired network (for example, Ethernet).

The user interface 108 operates to receive input from, for example, a user of the recognition device 100, to provide system output, or a combination of both. The user interface 108 obtains information and signals from, and provides information and signals to, (for example, over one or more wired and/or wireless connections) devices both internal and external to the recognition device 100. Input may be provided via, for example, a keypad, a microphone, soft keys, icons, or soft buttons on the display 110, a scroll ball, buttons, and the like. System output may be provided via the display 110. The display 110 is a suitable display such as, for example, a liquid crystal display (LCD) touch screen, or an organic light-emitting diode (OLED) touch screen. The recognition device 100 may implement a graphical user interface (GUI) (for example, generated by the electronic processor 102, from instructions and data stored in the memory 104, and presented on the display 110), that enables a user to interact with the recognition device 100. In some embodiments, the recognition device 100 operates or is integrated with a head-mounted display (HMD) or an optical head-mounted display (OHMD).

The sensor 112 is a device, for example an audio sensor, a video sensor, or a camera, for capturing a characteristic of a target object. The sensor 112 communicates the captured media to the electronic processor 102. In the context of the sensor 112, the term "media" may refer to one or more digital images, video, or audio captured by the sensor 112, or processed by the electronic processor 102, or displayed on the display 110. Although illustrated in FIG. 1 as being located within the recognition device 100, the sensor 112 may be located outside of the recognition device 100. In some embodiments, more than one sensor 112 is implemented. In such an embodiment, more than one kind of sensor 112 may be used (for example, a camera and a transducer).

Figure 2:
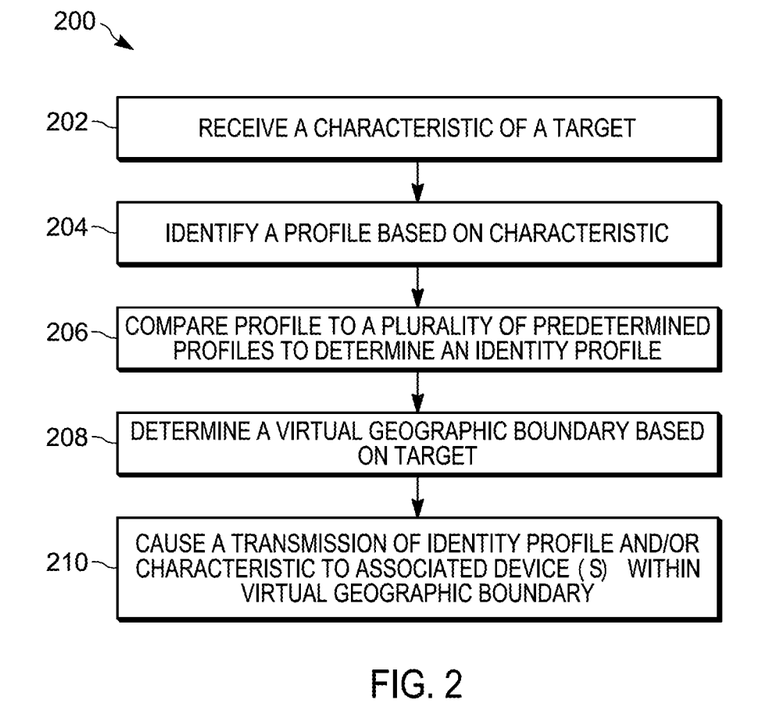
FIG. 2 is a flow chart of a method of recognizing a target in accordance with some embodiments.

FIG. 2 illustrates an example method 200 for recognizing a target. As an example, the method 200 is explained in terms of the recognition device 100 capturing and analyzing a characteristic captured by the sensor 112 to determine an identity of a target. The method 200 is described as being performed by the recognition device 100 and, in particular, the electronic processor 102 executing the characteristic recognition engine 113. However, it should be understood that in some embodiments, portions of the method 200 may be performed by other devices, including for example, a computer located in a public safety vehicle and wirelessly coupled to the recognition device 100.

At block 202, the electronic processor 102 receives a characteristic of the target from the sensor 112. In one embodiment, the characteristic is captured by the sensor 112 and received by the electronic processor 102. In other embodiments, the characteristic is received from a remote sensor 112. The electronic processor 102 identifies a profile based on the characteristic (block 204). In some embodiments, more than one characteristic is used to identify the profile. In some embodiments, in response to identifying a profile (that is, detecting the target), the electronic processor 102 presents an indication that the target has been detected on the display 110. The indication may be graphical, text-based, or both. In some embodiments, the electronic processor 102 may use augmented reality to indicate the target on a live video stream that includes the target.

At block 206, the electronic processor 102 compares the profile to a plurality of predetermined profiles 103 to determine a matching identity profile. The identity profile may be determined when one or more characteristics of the profile matches a predetermined profile. The more characteristics that match, the higher the confidence that the profiles match. In some embodiments, one or more predetermined profiles 103 may be stored locally in the memory 104 of the recognition device 100. In such embodiments, the identity profile is stored locally on the device. In some embodiments, when the identity profile is stored in the memory 104, the electronic processor 102 is configured to determine whether the identity profile is also stored on the database 101. When the identity profile is not stored on the database 101, the electronic processor 102 uploads the identity profile to the database 101.

When the identity profile is not found in the memory 104, the electronic processor 102 uploads the profile to one or more of the databases 101 to find a matching identity profile. When the identity profile is not found on the database 101, the electronic processor 102 creates an identity profile. In some embodiments, the electronic processor 102 uses the sensor 112 to collect more characteristics and implement more characteristic recognition processes to create a detailed identity profile. The new identity profile may then be uploaded to the database 101.

When the identity profile is found on the database 101, the electronic processor 102 downloads the identity profile and, as explained in further detail below, temporarily stores the identity profile in the memory 104.

Figure 3A:
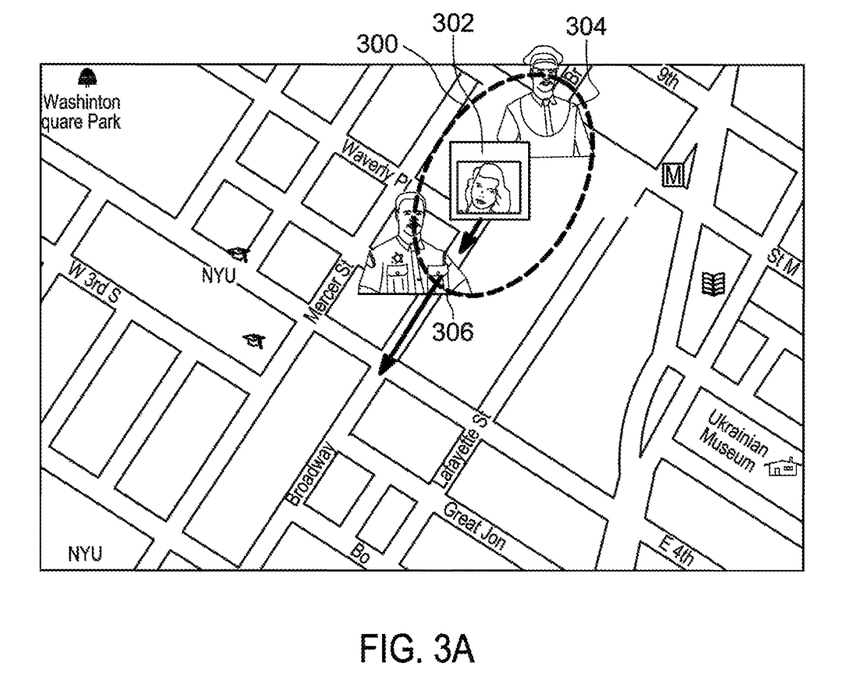
FIG. 3A is a diagram illustrating a virtual geographic boundary around a target in accordance with some embodiments.
Figure 3B:
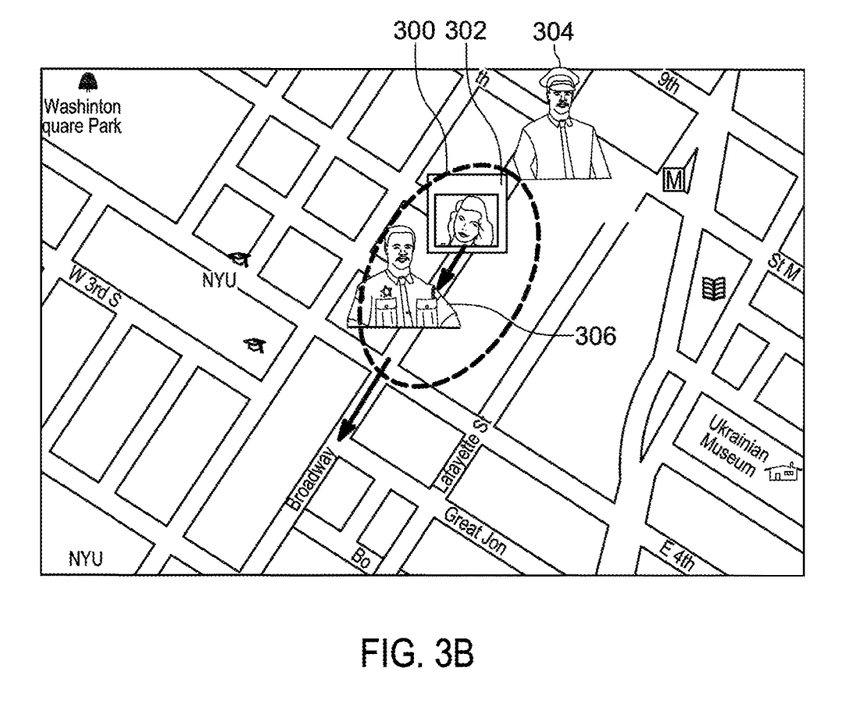
FIG. 3B is a diagram illustrating a virtual geographic boundary around a target in accordance with some embodiments.
Figure 3C:
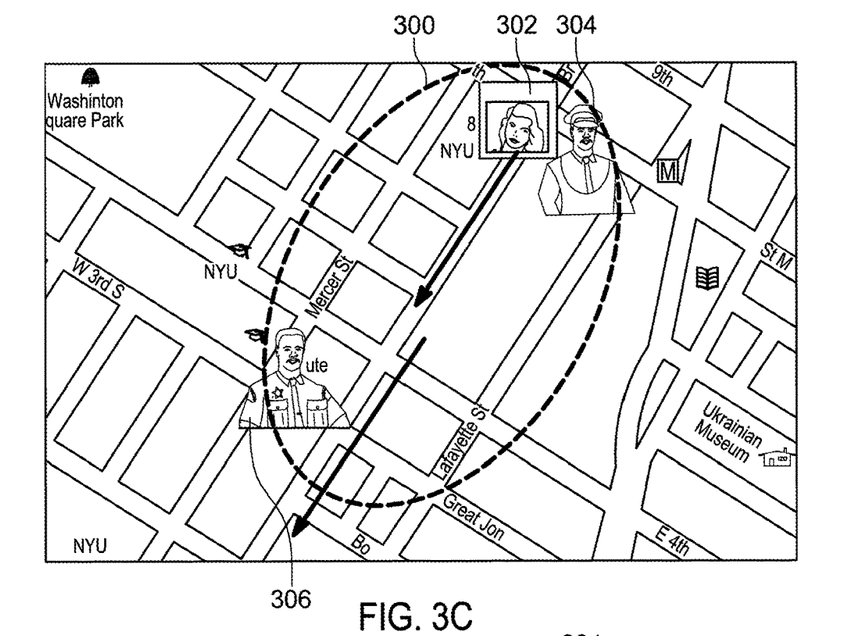
FIG. 3C is a diagram illustrating a virtual geographic boundary around a target in accordance with some embodiments.
Figure 3D:
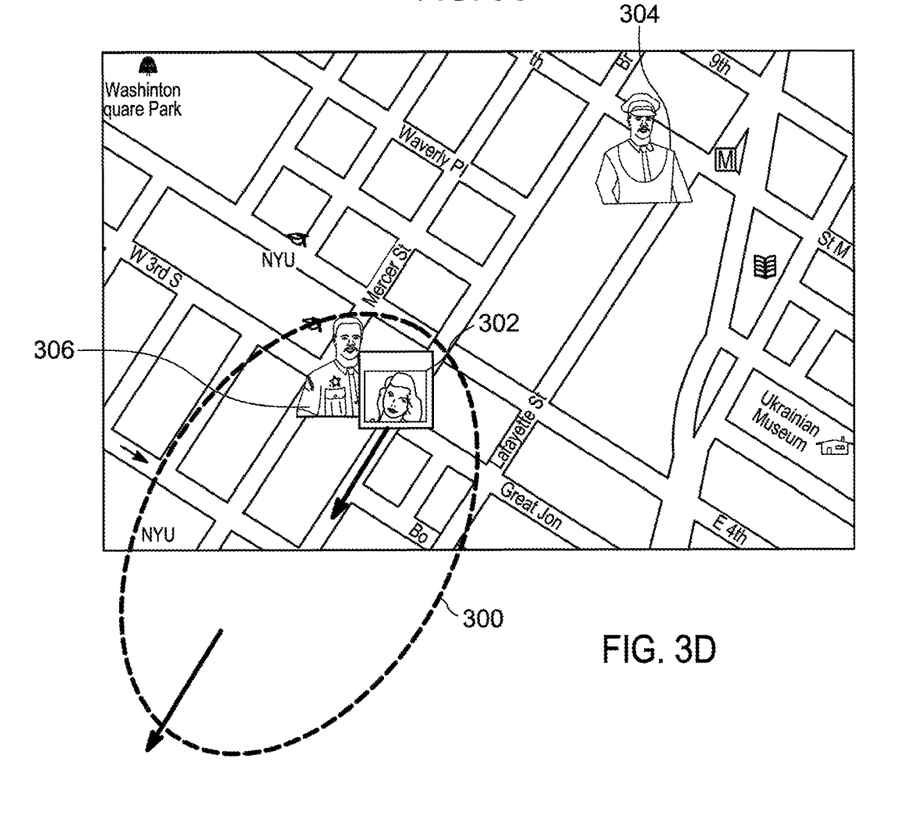
FIG. 3D is a diagram illustrating a virtual geographic boundary around a target in accordance with some embodiments.

At block 208, the electronic processor 102 determines a virtual geographic boundary 300 (see FIGS. 3A-3D) based on the target. The virtual geographic boundary 300, or geofence, is a virtual boundary superimposed on an area surrounding the target. The configuration of the geofence 300 is determined and updated based on one or more of a location of the target, speed of the target, and a direction of movement of the target. For example, the size of the geofence 300 depends on the speed of the target. FIGS. 3A and 3C each illustrate configurations of a geofence 300. The geofence 300 surrounds a target 302. In FIGS. 3A and 3B, the target 302 is determined by the recognition device 100 to be moving slowly (for example, walking). Thus, the geofence 300 is small (for example, 15 feet out from the target 302) and moves slowly with the target 302. In FIGS. 3C and 3D, the target 302 is determined by the recognition device 100 to be moving quickly (for example, running). Thus, the geofence 300 is large (for example, 50 feet out from the target 302) and moves quickly with the target 302. The geofence 300 illustrated in FIGS. 3A-3D is oval and elongated in the same direction as the target's movement. Although illustrated in FIGS. 3A-3D as an oval, it should be understood other shapes and configurations of the geofence 300 are possible. The recognition device 100 may determine additional characteristics of the target and stream the additional characteristics to the database 101 to update the identity profile while the target is within the geofence based on at least one selected from the group consisting of a location of the target, speed of the target, and a direction of movement of the target.

When the target leaves or moves outside of the geofence, the electronic processor 102 may remove or delete the identity profile from the memory 104.

In some embodiments, the electronic processor 102 is further configured to determine a hold duration. The hold duration defines a duration of time in which the identity profile is kept stored locally in the memory 104 of the recognition device 100. In some embodiments, the hold duration also defines the time in which characteristics of the target determined by the recognition device 100 are streamed to the database 101 to update the identity profile. The length of the hold duration is determined based on the speed of the target. For example, in FIGS. 3A and 3B, when it is determined that the target 302 is moving slowly, the hold duration is set longer (for example 30 minutes). Meanwhile, in FIGS. 3C and 3D, when it is determined that the target is moving quickly, the hold duration is shorter (for example, 15 minutes).

At the end of the hold duration, the recognition device determines if the target is still within the geofence. When the target is still within the geofence, a new hold duration is determined. If the target is not still within the geofence before the hold duration expires, the electronic processor 102 removes or deletes the identity profile from the memory 104 and stop streaming additional characteristics to the database 101. In some embodiments, the profile is deleted during an absence of the database 101 or the recognition device 100 receiving additional characteristics of the target from the sensor during the hold duration.

Returning to FIG. 2, at block 210 the electronic processor 102 causes a transmission of the identity profile (including the characteristic) to one or more associated devices within the virtual geographic boundary. An associated device is a computing device configured to implement part of the characteristic recognition process based on the information received from the recognition device 100. Each associated device includes at least an electronic processor, a memory, and a communication interface. One or more of the associated devices may be configured similarly as the recognition device 100. The one or more associated devices may perform the characteristic recognition of the same target based on the received identity profile. The received identity profile may be stored locally within one or more of the associated devices. In some embodiments, as described above in regards to FIGS. 3A-3D, the received identity profile is stored locally on each of the associated devices for the hold duration or while the one or more associated devices are within the virtual boundary. By storing the identity profile locally on the recognition device 100, the one or more associated devices are able to perform the characteristic recognition locally without the need to go through a server to retrieve or search for a match to the identify profile. The characteristic recognition is thus performed partially at the edge among the one or more associated devices (partial edge computing/intelligence). In some embodiments, the transmission is performed by the recognition device 100 using, for example, the communication interface 106. In some embodiments, the database 101 performs the transmission of the identity profile. In some embodiments, the transmission performed by the recognition device 100 or the database 101 includes the hold duration.

For example, in an embodiment consistent with FIG. 3A, the identity profile is transmitted to a first device 304 within the geofence 300 but not a second device 306 outside the geofence 300. As the geofence 300 moves according to the target 302, in an embodiment consistent with FIG. 3B, the second device 306 may enter the geofence 300 while the first device 304 moves outside of the geofence 300. In such an instance, the identity profile would be transmitted to only the second device 306. Likewise, in an embodiment consistent with FIG. 3C, the identity profile is transmitted to both the first device 304 and the second device 306 because they are both within the geofence 300. The devices may be configured similarly to that of the recognition device 100 and configured to perform similar characteristic recognition.

Although the method 200 is described in terms of only a single identity profile it should be understood that the recognition device 100 may simultaneously determine identity profiles of additional targets while performing the method 200 for a first target.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A recognition device comprising:
    a sensor configured to sense a characteristic of a target, wherein the sensor is at least one selected from the group consisting of an audio sensor, a camera, and a video sensor; and
    an electronic processor configured to
        receive the characteristic from the sensor;
        identify a profile based on the characteristic;
        compare the profile to a plurality of predetermined profiles to determine an identity profile, the identity profile corresponding to an identity of a person or an inanimate object;
        store the identity profile on a memory of the recognition device;
        identify the target based on the identity profile;
        determine either or both of a speed of the target and a direction of movement of the target based on an input from the sensor;
        determine a virtual geographic boundary around the target based on at least one selected from the group consisting of the speed of the target and the direction of movement of the target;
        determine, based on the speed of the target, a hold duration indicative of how long to store the identity profile in the memory;
        cause a transmission of the hold duration and at least one selected from the group consisting of the identity profile and the characteristic to at least one associated device located in the virtual geographic boundary; and
        delete the identity profile from the memory of the recognition device in response to at least one selected from the group consisting of an absence of receiving a second characteristic of the target during the hold duration and the target leaving the virtual geographic boundary.

2. The recognition device of claim 1, wherein the plurality of predetermined profiles are stored on either a memory of the recognition device or a remote server and the electronic processor is further configured to, when the identity profile is found on the remote server, store the identity profile in the memory of the recognition device.

3. The recognition device of claim 1, wherein the electronic processor is further configured to cause a transmission of the hold duration to the at least one associated device located in the virtual geographic boundary.

4. The recognition device of claim 1, wherein the transmission is performed by a remote server or the recognition device.

5. The recognition device of claim 1, wherein the characteristic is at least one from the group consisting of a facial feature, a vocal feature, and a feature of a wearable article.

6. The recognition device of claim 1, wherein a shape of the virtual geographic boundary is based on the direction of movement of the target.

7. The recognition device of claim 1, wherein a size of the virtual geographic boundary is based on a speed of the target.

8. The recognition device of claim 1, wherein the electronic processor is further configured to update the virtual geographic boundary based on at least one selected from the group consisting of a location of the target, speed of the target, and a direction of movement of the target.

9. A method of recognizing a target, the method comprising:
    receiving, from a sensor selected from the group consisting of an audio sensor, a camera, and a video sensor, a characteristic of the target;
    identifying a profile based on the characteristic;
    comparing the profile to a plurality of predetermined profiles to determine an identity profile, the identity profile corresponding to an identity of a person or an inanimate object;
    storing the identity profile on a memory;
    identifying the target based on the identity profile;
    determining either or both of a speed of the target and a direction of movement of the target based on an input from the sensor;
    determining a virtual geographic boundary based on at least one selected from the group consisting of the speed of the target and the direction of movement of the target;
    determining, based on the speed of the target, a hold duration indicative of how long to store the identity profile in the memory;
    causing a transmission of the hold duration and at least one selected from the group consisting of the identity profile and the characteristic to at least one associated device located in the virtual geographic boundary; and
    deleting the identity profile from the memory of the recognition device in response to at least one selected from the group consisting of an absence of receiving a second characteristic of the target during the hold duration and the target leaving the virtual geographic boundary.

10. The method of claim 9, wherein the plurality of predetermined profiles are stored on either a memory of a recognition device or a remote server and the method further comprises when the identity profile is found on the remote server, storing the identity profile in the memory of the recognition device.

11. The method of claim 9, further comprising transmitting the hold duration to the at least one associated device located in the virtual geographic boundary.

12. The method of claim 9, wherein the transmission is performed by a remote server or a recognition device.

13. The method of claim 9, wherein the characteristic is at least one from the group consisting of a facial feature, a vocal feature, and a feature of a wearable article.

14. The method of claim 9, wherein a shape of the virtual geographic boundary is based on the direction of movement of the target.

15. The method of claim 9, wherein a size of the virtual geographic boundary is based on a speed of the target.

16. The method of claim 9, the method further comprising updating the virtual geographic boundary based on at least one selected from the group consisting of a location of the target, speed of the target, and a direction of movement of the target.

* * * * *